Figures 1, 2:
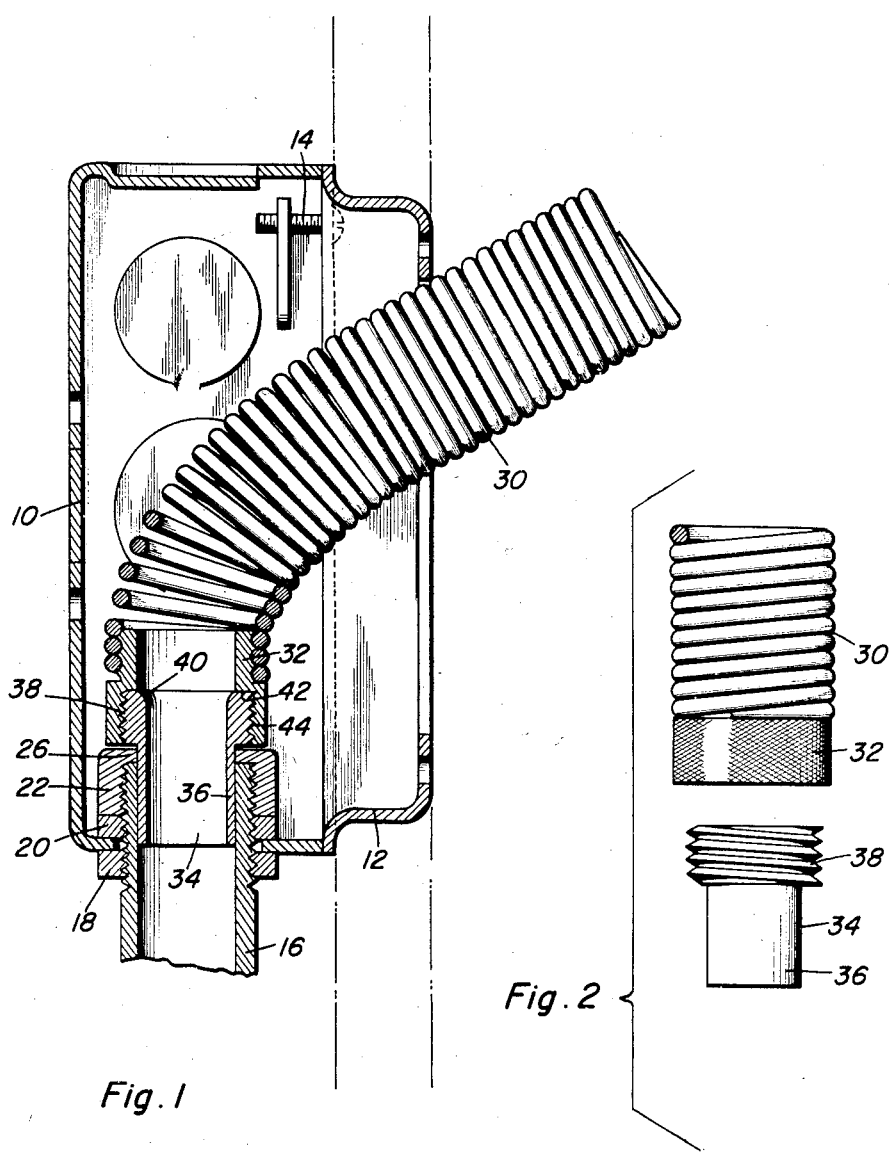

June 10, 1958  E. G. EYLES  2,838,280
WIRE GUIDE ADAPTER
Filed Jan. 13, 1956

Edward G. Eyles
INVENTOR.

BY
Attorneys

United States Patent Office 2,838,280
Patented June 10, 1958

2,838,280

WIRE GUIDE ADAPTER

Edward G. Eyles, Fitchburg, Mass.

Application January 13, 1956, Serial No. 558,989

1 Claim. (Cl. 254—134.3)

This invention relates to improvements in wire guides of the type which are useful primarily by the electrician while he draws wire through a conduit.

An object of the present invention is to provide an improved wire guide by applying an adapter to the collar at the end thereof, this adapter making it possible to connect the wire guide to the conduit directly without removal of the bushing on the conduit in order to reduce the time and effort necessary for the connection of the wire guide preparatory to pulling wire through the conduit.

A more specific object of the invention is to provide an adapter for a wire guide, the adapter including a sleeve having a smooth portion which fits into the bore of the conduit and the bushing which holds the conduit in place in an electrical outlet box, the adapter sleeve including also means, preferably threads, for detachable connection to a wire guide collar, the edge of the adapter which fits innermost within the collar being chamfered so as to avoid the presentation of sharp edges to the wire as it is being drawn into the conduit.

Other objects and features of importance will become apparent in following the description of the illustrated form of the invention which is shown in the drawing, wherein:

Figure 1 is a sectional view of a standard electrical outlet box having a plaster cover thereon together with a sectional view of the adapter as it is fitted in the conduit and bushing and on the end of a fragmentarily shown wide guide; and, Figure 2 is an exploded view in elevation showing the adapter and the collar at the end of the wire guide to which the adapter is secured.

The electrical outlet box 10 is of standard construction and has a plastic cover 12 thereon, although other covers may be used. The same option applies to the means of fastening the cover in place, for example the usual manner is to have screws 14 pass through holes in the cover and into a threaded flange of the box 10. When different types of boxes are used, slightly different structural arrangements will be observed, however, the operation of the wire guide improved by the adapter will not be altered.

Electrical conduit 16 is attached to the box 10 by standard means. For example, the threaded end of the conduit is passed through an aperture in the box and there are nuts 18 and 20 on opposite sides of the wall of the box through which the conduit 16 passes. Bushing 22 fits on the threaded end of the conduit and has an inwardly extending flange 26 which fits over the end of the conduit 16. This is one type of accepted coupling for the conduit and electrical box 10.

When a wire is to be drawn through the conduit 16, a snake is usually used. In addition, a wire guide is found to be helpful in threading the wire through the opening of the box. A typical wire guide comprises a flexible tube 30 having at one end a collar 32.

Collar 32 is suitably connected to the end of the flexible tube 30, as by being threaded thereinto. It has a knurled outer surface adapted to be gripped by the electrician while it is threaded on the inner end of conduit 16. As seen in Figure 1, this would necessitate the removal of the bushing 22 so that the collar 32 may be threaded thereon. Then, after the wire is drawn through the conduit 16, the collar 32 must be removed and the bushing 22 replaced.

The adapter 34 is used in the collar 32 whereby it is unnecessary to remove the bushing 22 and whereby it is much easier to connect the wire guide to the conduit 16. Adapter 34 consists of a sleeve having a smooth end portion 36 which is slidable in the bore of the conduit 16 and also in the bore of the bushing 22 defined at the inner edge of flange 26. Threads 38 are formed on the end of the sleeve and are adapted to be engaged with the threads of collar 32 thereby separably connecting the adapter to the collar 32. The inner edge 40 of adapter 34 is chamfered in order to present a smoothly contoured surface to the wire as it is drawn through the conduit 16.

As seen in Figure 1, the adapter 34 has a shoulder 42 between its ends, this shoulder separating the threads 44 from the smooth bore thereof. When adapter 34 is threaded into the collar 32 the inner end thereof comes to bear against shoulder 42.

In use, the adapter 34 will be provided in sets, that is, there will be a number of adapters 34 suitably dimensioned to fit snugly the various standard size conduits. After the snake is pushed through the conduit 16, the wire guide 30 is placed thereon and the adapter 34 slipped into the bore of conduit 16. Then after attachment of the wire to the snake, the snake is returned through conduit 16 drawing the wire through the guide 30 and the adapter 34. Upon completion, the adapter is removed, the complete operation being performed without the removal of any of the means that fasten the conduit 16 to the electrical outlet box 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

In a wire guide for pulling wire through a conduit that is connected to an electrical box by means of a bushing which has a bore coaxial with the bore of the conduit, said guide including a flexible tube to one end of which there is attached a collar having internal threads with a shoulder at the inner end thereof, an adapter for said collar which is arranged to fit directly into the bores of the conduit and bushing, said adapter comprising a sleeve provided with external threads which are engageable within the threads in said collar, an externally smooth smaller diameter portion which is axially slidable into said bores thereby holding said wire guide attached to the conduit and bushing, one end of said sleeve abutting said shoulder when said sleeve is threaded in said collar, and the edge of said sleeve at the inner edge of said shoulder being chamfered to prevent the wire from becoming snarled thereon.

References Cited in the file of this patent

UNITED STATES PATENTS

| | | |
|---|---|---|
| 1,742,793 | Staples | Jan. 7, 1930 |
| 2,515,724 | McCroskey | July 18, 1950 |
| 2,746,716 | Zachary | May 22, 1956 |